US009687775B2

(12) United States Patent
Chen et al.

(10) Patent No.: US 9,687,775 B2
(45) Date of Patent: Jun. 27, 2017

(54) CHEMICALLY STABLE CERAMIC-METAL COMPOSITE MEMBRANE FOR HYDROGEN SEPARATION

(71) Applicant: University of South Carolina, Columbia, SC (US)

(72) Inventors: Fanglin Chen, Irmo, SC (US); Shumin Fang, Columbia, SC (US); Kyle S. Brinkman, Aiken, SC (US)

(73) Assignees: University of South Carolina, Columbia, SC (US); Clemson University Research Foundation, Clemson, SC (US)

( * ) Notice: Subject to any disclaimer, the term of this patent is extended or adjusted under 35 U.S.C. 154(b) by 0 days.

(21) Appl. No.: 14/678,372

(22) Filed: Apr. 3, 2015

(65) Prior Publication Data
US 2015/0314232 A1 Nov. 5, 2015

Related U.S. Application Data

(60) Provisional application No. 61/995,149, filed on Apr. 3, 2014.

(51) Int. Cl.
*B01D 53/22* (2006.01)
*B01D 67/00* (2006.01)
(Continued)

(52) U.S. Cl.
CPC .......... *B01D 53/22* (2013.01); *B01D 53/228* (2013.01); *B01D 67/0041* (2013.01);
(Continued)

(58) Field of Classification Search
CPC .. B01D 53/22; B01D 53/228; B01D 67/0041; B01D 67/0083; B01D 69/12;
(Continued)

(56) References Cited

U.S. PATENT DOCUMENTS

| 5,614,039 A * | 3/1997 | Nayar | B23K 35/383 |
| | | | 148/600 |
| 2005/0271924 A1* | 12/2005 | Coors | C01B 3/503 |
| | | | 429/411 |

(Continued)

OTHER PUBLICATIONS

Fang, Shumin, et al.; "Relationship between fabrication method and chemical stability of Ni—$BaZr_{0.8}Y_{0.2}O_{3-\delta}$ membrane" Journal of Power Sources, 278 (2015) pp. 614-622.

*Primary Examiner* — Jason M Greene
(74) *Attorney, Agent, or Firm* — Dority & Manning, P.A.

(57) ABSTRACT

A hydrogen permeation membrane is provided that can include a metal and a ceramic material mixed together. The metal can be Ni, Zr, Nb, Ta, Y, Pd, Fe, Cr, Co, V, or combinations thereof, and the ceramic material can have the formula: $BaZr_{1-x-y}Y_xT_yO_{3-\delta}$ where $0 \leq x \leq 0.5$, $0 \leq y \leq 0.5$, $(x+y)>0$; $0 \leq \delta \leq 0.5$, and T is Sc, Ti, Nb, Ta, Mo, Mn, Fe, Co, Ni, Cu, Zn, Ga, In, Sn, or combinations thereof. A method of forming such a membrane is also provided. A method is also provided for extracting hydrogen from a feed stream.

18 Claims, 13 Drawing Sheets

(51) Int. Cl.
- *B01D 71/02* (2006.01)
- *B01D 69/12* (2006.01)
- *C01B 3/50* (2006.01)
- *B22F 3/12* (2006.01)
- *B22F 5/00* (2006.01)
- *B01D 69/14* (2006.01)
- *C22C 1/05* (2006.01)
- *C22C 29/12* (2006.01)
- *H01M 8/124* (2016.01)

(52) U.S. Cl.
CPC ......... *B01D 67/0083* (2013.01); *B01D 69/12* (2013.01); *B01D 69/141* (2013.01); *B01D 71/022* (2013.01); *B01D 71/024* (2013.01); *B22F 3/12* (2013.01); *B22F 5/006* (2013.01); *C01B 3/503* (2013.01); *C22C 1/05* (2013.01); *C22C 29/12* (2013.01); *B01D 2256/16* (2013.01); *B01D 2323/08* (2013.01); *B01D 2323/12* (2013.01); *B01D 2325/20* (2013.01); *B22F 2998/10* (2013.01); *C01B 2203/0233* (2013.01); *C01B 2203/0405* (2013.01); *C01B 2203/0475* (2013.01); *C01B 2203/0495* (2013.01); *H01M 8/124* (2013.01); *H01M 2300/0091* (2013.01); *Y02P 70/56* (2015.11)

(58) Field of Classification Search
CPC .. B01D 69/141; B01D 71/022; B01D 71/024; B01D 2256/16; B01D 2257/108; B01D 2323/08; B01D 2323/12; C01B 3/503; C01B 3/505; C22C 1/05; C22C 29/12; B22F 3/12; B22F 5/006

See application file for complete search history.

(56) References Cited

U.S. PATENT DOCUMENTS

| | | | |
|---|---|---|---|
| 2007/0044662 A1* | 3/2007 | Song | B01D 53/228 96/4 |
| 2007/0044663 A1* | 3/2007 | Song | B01D 53/228 96/11 |
| 2007/0270301 A1* | 11/2007 | Song | B01D 53/228 501/80 |
| 2009/0136695 A1* | 5/2009 | Damani | B01D 67/0072 428/34.4 |
| 2011/0176980 A1* | 7/2011 | Larsen | B01D 53/228 423/219 |
| 2012/0291696 A1* | 11/2012 | Clarke | C30B 25/14 117/88 |
| 2015/0044596 A1* | 2/2015 | Hiraiwa | C04B 35/48 429/482 |
| 2016/0051941 A1* | 2/2016 | Li | B01D 53/228 96/4 |

\* cited by examiner

CHEMICALLY STABLE CERAMIC-METAL COMPOSITE MEMBRANE FOR HYDROGEN SEPARATION

PRIORITY INFORMATION

The present application claims priority to U.S. Provisional Patent Application Ser. No. 61/995,149 titled "A Novel Chemically Stable Ceramic-Metal Composite Membrane for Hydrogen Separation" of Chen, et al. filed on Apr. 3, 2014, the disclosure of which is incorporated by reference herein.

GOVERNMENT SUPPORT CLAUSE

This invention was made with government support under DE-SC0001061 awarded by the US Department of Energy, 00102125 awarded by Battelle Energy Alliance, LLC/US Department of Energy, and under B139006 awarded by the SC Universities Research & Education Foundation/SRNS/US Department of Energy. The government has certain rights in the invention.

BACKGROUND

As an important raw material for the production of ammonia, methanol, and liquid hydrocarbons, hydrogen is mainly produced through catalytic steam reforming of methane, which is strongly endothermic and requires high temperature (e.g., about 700° C. to about 900° C.) to achieve maximum conversion to $H_2$, CO, and $CO_2$ at high pressure (e.g., about 20 bar to about 40 bar). High purity hydrogen can then be directly obtained via a separation step such as hydrogen permeation through a proton-conducting membrane under a pressure gradient at high temperature. The application of membrane technology is expected to considerably reduce the capital and energy cost in hydrogen production. Composite membranes consisting of $BaCeO_3$-based proton conductor and electronic conductor (e.g. nickel) have been developed for this application. However, these membranes (e.g. Ni—$BaZr_{0.8-x}Ce_xY_{0.2}O_{3-\delta}$ (Ni—BZCY), $0.4 \leq x \leq 0.8$) suffered serious performance loss in $CO_2$-containing environment at 900° C. due to reaction between $BaCeO_3$ and $CO_2$. U.S. Pat. No. 6,569,226 B1 issued to Doors et al. on May 27, 2004 discloses a hydrogen permeable composite membrane based on hydrogen transporting metal and a non-proton-conducting ceramic, such as $ZrO_2$, $Al_2O_3$, $BaTiO_3$, and $SrTiO_3$. These ceramics only contribute to the mechanical strength of the composite membrane but not the hydrogen permeability. Among the proton conductors that are tolerant to $CO_2$, $BaZr_{0.8}Y_{0.2}O_{3-\delta}$ (BZY)-based materials possesses the highest bulk proton conductivity, and high mechanical strength.

SUMMARY

Objects and advantages of the invention will be set forth in part in the following description, or may be obvious from the description, or may be learned through practice of the invention.

A hydrogen permeation membrane is generally provided. In one embodiment, the hydrogen permeation membrane comprises: a metal and a ceramic material mixed together. The metal can be Ni, Zr, Nb, Ta, Y, Pd, Fe, Cr, Co, V, or combinations thereof, and the ceramic material can have the formula:

$$BaZr_{1-x-y}Y_xT_yO_{3-\delta}$$

where $0 \leq x \leq 0.5$, $0 \leq y \leq 0.5$, $(x+y)>0$; $0 \leq \delta \leq 0.5$, and T is Sc, Ti, Nb, Ta, Mo, Mn, Fe, Co, Ni, Cu, Zn, Ga, In, Sn, or combinations thereof.

A method of forming a membrane is also generally provided. In one embodiment, the method includes mixing a metal and a ceramic powder to form a metal-ceramic mixture; pressing the metal-ceramic mixture to form a composite membrane; and sintering the metal-ceramic mixture at a temperature of about 1100° C. to about 1700° C. The metal can be Ni, Zr, Nb, Ta, Y, Pd, Fe, Cr, Co, V, or a combination thereof, and the ceramic powder can be a ceramic material having the formula:

$$BaZr_{1-x-y}Y_xT_yO_{3-\delta}$$

where $0 \leq x \leq 0.5$, $0 \leq y \leq 0.5$, $(x+y)>0$; $0 \leq \delta \leq 0.5$, and T is Sc, Ti, Nb, Ta, Mo, Mn, Fe, Co, Ni, Cu, Zn, Ga, In, Sn, or combinations thereof.

A method is also generally provided for extracting hydrogen from a feed stream. In one embodiment, the method includes exposing the feed stream to a first side of a membrane at a temperature of about 600° C. to about 1000° C., wherein the feed stream comprises hydrogen; and collecting pure hydrogen gas from a second side of the membrane opposite of the first side. The membrane comprises a metal and a ceramic material, with the metal being Ni, Zr, Nb, Ta, Y, Pd, Fe, Cr, Co, V, or a combination thereof. The ceramic material can have the formula: $BaZr_{1-x-y}Y_xT_yO_{3-\delta}$, where $0 \leq x \leq 0.5$, $0 \leq y \leq 0.5$, $(x+y)>0$; $0 \leq \delta \leq 0.5$, and T is Sc, Ti, Nb, Ta, Mo, Mn, Fe, Co, Ni, Cu, Zn, Ga, In, Sn, or combinations thereof.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1:
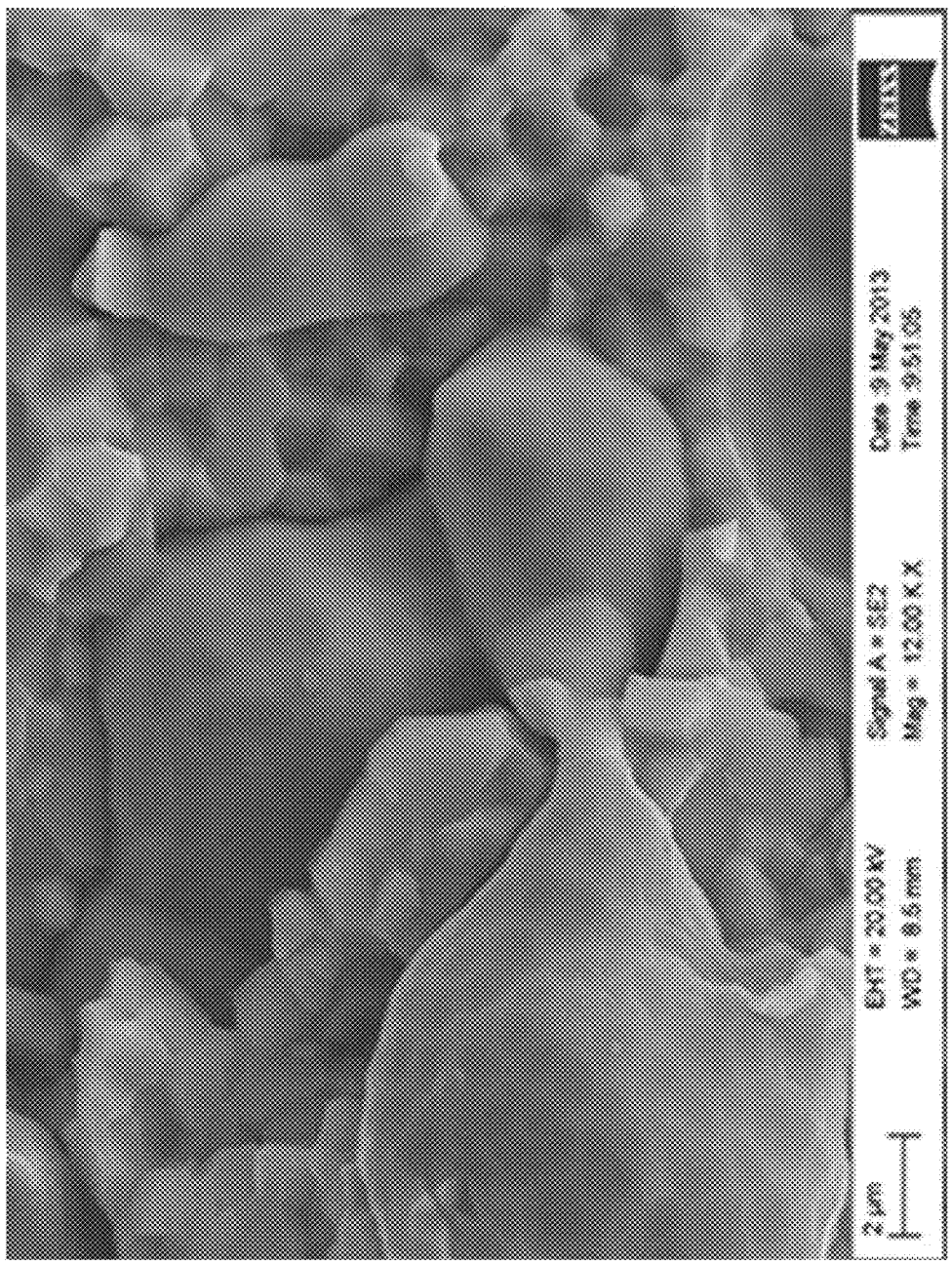
FIG. 1 shows the cross-section SEM image of a sintered Ni—BZY membrane, according to the Examples. Ni particles (2~10 µm) were embedded in the dense BZY ceramic matrix. The size of BZY grains is about 1 µm. The membrane is very dense and free of pores.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale up to about 100 nm. For example, particles having an average diameter on the nanometer scale (e.g., from about 0.1 nm to about 100 nm) are referred to as "nanoparticles."

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Composite metal-BZY-based membranes are expected to possess both high hydrogen permeation flux, mechanical strength, and chemical stability, which are the key factors for successful adoption of hydrogen permeation membrane for practical applications. The metal here can be Nickel, Zirconium, Niobium, Tantalum, Yttrium, Palladium, Iron, Chromium, Cobalt, Vanadium, etc, or the binary alloy of these metals.

Metal-ceramic composite membranes are generally provided, along with their methods of preparation. In one embodiment, the metal-ceramic composite membranes include

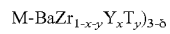

$$M\text{-}BaZr_{1-x-y}Y_xT_y)_{3-\delta}$$

where 0≤x≤0.5, 0≤y≤0.5; M is Ni, Zr, Nb, Ta, Y, Pd, Fe, Cr, Co, V, or a combinations thereof; and T is Sc, Ti, Nb, Ta, Mo, Mn, Fe, Co, Ni, Cu, Zn, Ga, In, Sn, or a combinations thereof. This structure is referred to herein as "M-BZYT". In one embodiment, the volume ratio of BZYT is between about 40% and about 80% (e.g., about 40% to about 70% by volume).

The M-BZYT membranes show excellent high hydrogen permeation flux and chemical stability in H$_2$O, CO$_2$, H$_2$S and other contaminants. Commercial metal powder is used as source of metal phase. Sintering-active BZY powders and metal powders are mixed, pressed, and sintered to obtain dense composite membranes. The membranes shows stable performance in the presence of concentrated CO$_2$, H$_2$S.

The invention provides composite membranes based on metal and perovskite oxide BZY for hydrogen permeation. Hydrogen can diffuse through the membrane in the form of atoms through metal phase or protons through BZYT phase. The critical properties of the membranes include permeation flux, chemical stability in H$_2$O, CO$_2$, and H$_2$S-containing atmosphere.

The invented membranes are useful for extracting hydrogen from any feed stream containing hydrogen with a pressure between 1 and 1000 psi at a temperature between 600 and 1000° C. Theoretically, 100% pure hydrogen is obtained because the membranes are dense and allow no other gas to pass through. The flux of the membrane can be affected by many parameters, including phase composition of BZYT phase, volume ratio of metal and BZY, membrane thickness, temperature, and humidity content in feed gas.

The method of forming such membranes can include mixing a metal and a BZYT powder, pressing, and sintering at temperature between about 1100° C. and about 1700° C. The sintering atmosphere can be reducing atmosphere (e.g., 5% H$_2$/N$_2$). The atmosphere can also be first in inert gas (N$_2$, Ar, etc) and then in reducing atmosphere containing hydrogen (e.g., 5% H$_2$/N$_2$).

EXAMPLES

Hydrogen separation membranes based on high temperature proton conductors have been pursued for a long time because of its potential to greatly reduce the energy and capital cost of large-scale hydrogen production from steam methane reforming (SMR). A key to their successful applications is the development of a membrane with high performance, chemical and mechanical stability. Yttrium-doped barium cerate (BCY) possesses high proton conductivity but poor chemical stability in H$_2$O and CO$_2$. Numerous efforts have been devoted to the improvement of its chemical stability, mainly through the partial replacement of Ce by cations such as In, Sn, Ti, Zr, Nb, Ta, etc. The performance of Ni—BaCe$_{0.8}$Y$_{0.2}$O$_{3-\delta}$ (Ni-BCY) and Ni—BaZr$_{0.1}$Ce$_{0.7}$Y$_{0.2}$O$_{3-\delta}$ (Ni—BZCY) degraded ~100% and 43%, respectively, in wet 40% H$_2$ and 30% CO$_2$ at 900° C.

Another strategy is to develop hydrogen separation membranes with chemically stable proton conductors such as $Ln_6WO_{12-\delta}$ (Ln refers to lanthanides), Ca-doped $LaNbO_4$, and $Ni-La_{0.4875}Ca_{0.0125}Ce_{0.5}O_{2-\delta}$, but their performances are still much inferior to that of Ni—BZCYYb, mostly due to their lower proton and/or electronic conductivities. Y-doped $BaZrO_3$ (BZY) has recently been explored as a proton conductor for electrolyte of solid oxide fuel cells and hydrogen separation membranes because of its excellent bulk proton conductivity and chemical stability. Since $BaZr_{0.8}Y_{0.15}Mn_{0.05}O_{3-\delta}$ (BZYM) shows very poor hydrogen flux due to the lack of electronic conductivity, dense composite Ni—BZY membranes have been fabricated and demonstrated much higher hydrogen flux than that of BZYM. During the fabrication of BZY and Ni—BZY membranes, the main obstacles are BZY's highly refractory nature, poor grain boundary proton conductivity, and high number of grain boundaries due to limited grain growth during sintering. One viable solution to these problems is the adoption of sintering aids (e.g., NiO, ZnO, CuO, $LiNO_3$) which can significantly lower the sintering temperature of BZY and promote the grain growth. NiO has been reported as the most effective sintering aid in promoting the grain growth, which is crucial to reduce the large grain boundary resistance. Dense BZY ceramic with grains as large as 5 μm can be achieved using BZY powders prepared by solid state reactive sintering method with 1 wt. % NiO after sintering at 1500° C. for 24 h, accompanied by the formation of a secondary phase, $BaY_2NiO_5$, which has a low melting point and promotes the sintering of BZY. In our previous study, dense Ni—BZY membrane with large BZY grains (1-2 μm) was successfully fabricated using BZY powder prepared by solid state reaction method with 2 wt. % NiO (denoted as $BZYNiO_2$) containing $BaY_2NiO_5$. In contrast, the BZY grains are very small (~0.25 μm) in the membrane prepared using Ni—BZY powder obtained from the gel combustion method and subsequent reduction, which contains no $BaY_2NiO_5$. Apparently, $BaY_2NiO_5$ plays an important role in the fabrication of dense Ni—BZY membrane with large BZY grains. These studies have mainly focused on the sintering behavior, microstructure, and electrical/permeation properties. No work has been reported on the chemical stability of BZY and Ni—BZY in $H_2$, $H_2O$, and $CO_2$ after the introduction of the sintering aids, which is crucial for their successful applications. Although the weight ratio of NiO sintering aid seems to be low, the weight ratio of $BaY_2NiO_5$ is high due to the large difference in molecular weight between $BaY_2NiO_5$ (453.83 g/mol) and NiO (74.69 g/mol). If 2 wt. % NiO (based on the total weight of $BaCO_3$, $ZrO_2$, and $Y_2O_3$) is completely converted to $BaY_2NiO_5$, there should be 13.8 wt. % $BaY_2NiO_5$ in the $BZYNiO_2$ ceramic. Unlike BZY, $BaY_2NiO_5$ may be unstable in $H_2$, $H_2O$, or $CO_2$-containing atmospheres at elevated temperatures, potentially leading to the chemical instability of $BZYNiO_2$ ceramic and Ni—BZY membrane, and thus insulating phases will be formed on the surfaces and the performance will degrade after exposure to $H_2O$ and $CO_2$. Fortunately, this problem can be mitigated by reducing the amount of $BaY_2NiO_5$ through tailoring the BZY powders used in the fabrication process. In the Ni—BZY membrane prepared with $BZYNiO_2$ (denoted as Ni—BZY1), 2 wt. % NiO was directly mixed with $BaCO_3$, $Y_2O_3$, and $ZrO_2$ in the preparation of $BZYNiO_2$. A lot of $BaY_2NiO_5$ is formed in the following calcination process. Ni—BZY2 membrane is fabricated using $BaZr_{0.8}Y_{0.2}O_{3-\delta}$ prepared by solid state reaction method without NiO (denoted as BZY20-SSR). However, $BaY_2NiO_5$ is still formed by the reaction among NiO (formed by partial oxidation of Ni during the sintering in $N_2$ containing a little oxygen), residual $BaCO_3$, and $Y_2O_3$ in BZY20-SSR. Because the amount of $BaCO_3$ and $Y_2O_3$ is much less than that in uncalcined $BZYNiO_2$, the amount of $BaY_2NiO_5$ in Ni—BZY2 should be less than that of Ni—BZY1. In order to further reduce the amount of $BaY_2NiO_5$, we employee BZY20 powder prepared by combined EDTA-citric (CEC) method (BZY20-CEC). CEC is a wet-chemical method and the distribution of particles is much more homogeneous than that of solid state reaction. Therefore, BZY20-CEC is free of residual $BaCO_3$ and $Y_2O_3$ after calcination, and will not contribute to the formation of $BaY_2NiO_5$, which allows us to adjust the amount of $BaY_2NiO_5$ by partially replacing BZY20-SSR with BZY-CEC. Therefore, another two Ni—BZY membranes were prepared by further replacing 60% and 80% BZY20-SSR powder in Ni—BZY2 by BZY20-CEC (denoted as Ni—BZY3 and Ni—BZY4, respectively). The amount of $BaY_2NiO_5$ is expected to follow this order: Ni—BZY1>Ni—BZY2>Ni—BZY3>Ni—BZY4.

In this study, the performance stability of these Ni—BZY membranes was evaluated in wet $H_2$ with and without $CO_2$ at 900° C. The chemical stability of $BaY_2NiO_5$, $BZYNiO_2$, and Ni—BZY was investigated in $H_2$, $H_2O$, and $CO_2$-containing atmospheres. A stable Ni—BZY membrane was developed, demonstrating excellent chemical and performance stability in the presence of $H_2$, $H_2O$, and $CO_2$.

Experimental

Figure 5A:
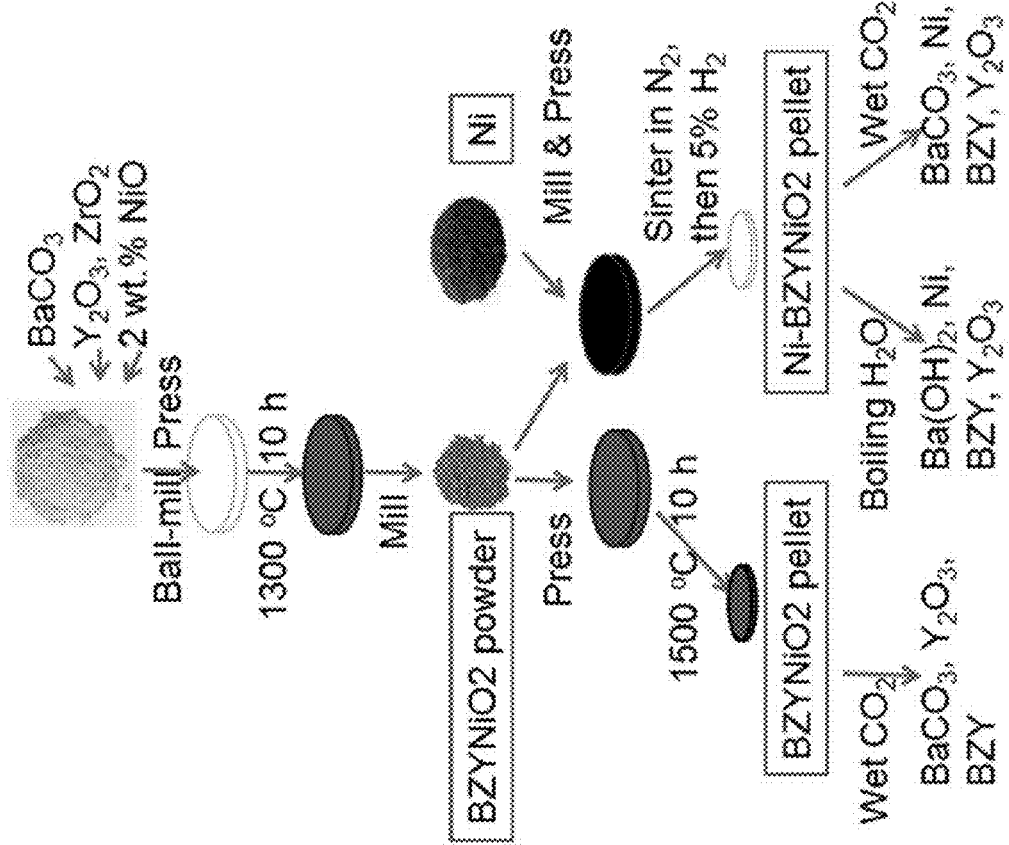
FIG. 5a shows a schematic for the synthesis and chemical stability test processes of BZYNiO2 and Ni—BZYNiO2 (denoted as Ni—BZY1 in Table 1).
Figure 5B:
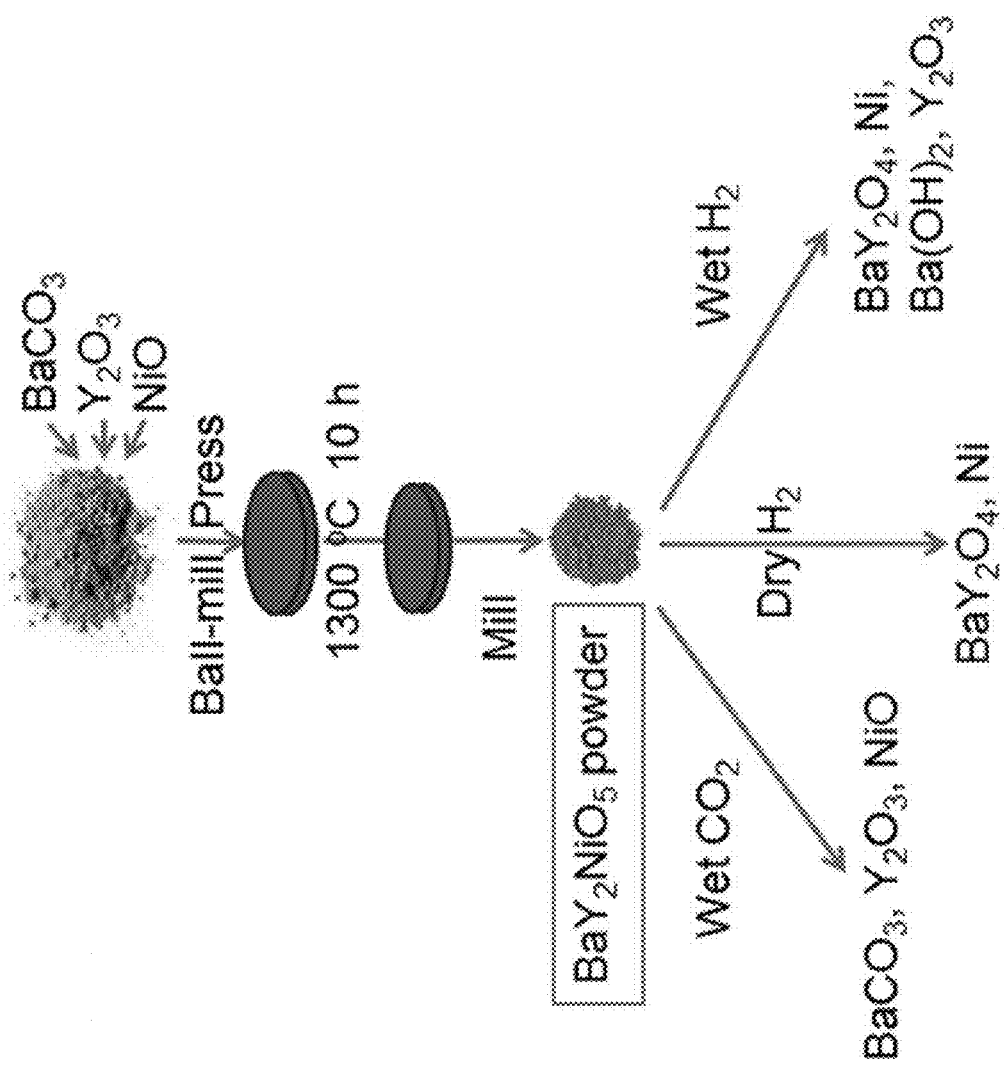
FIG. 5b shows a schematic for the synthesis and chemical stability test processes of BaY$_2$NiO$_5$.

FIGS. 5a and 5b show the schematic of the material synthesis and chemical stability test processes employed in this work. All chemicals were purchased from Alfa Aesar with purity >99.5%. BZY powders were prepared through the solid state reaction method using 0 and 2 wt. % NiO as sintering aid (denoted as BZY20 and $BZYNiO_2$, respectively). For simplicity, only $BZYNiO_2$ is shown in FIGS. 5a and 5b. Stoichiometric amounts of $BaCO_3$, $ZrO_2$, and $Y_2O_3$ were ball-milled in ethanol with $ZrO_2$ balls for 24 h. 0 and 2 wt. % NiO based on the total weight of $BaCO_3$, $ZrO_2$, and $Y_2O_3$ were added to the powder mixture prior to the ball-milling to obtain BZY20 and $BZYNiO_2$ powders, respectively. The ball-milled powders were dried and then pressed into pellets followed by calcination at 1300° C. for 10 h. The calcined pellets were milled to obtain BZY20 and $BZYNiO_2$ powders, respectively. To obtain dense $BZYNiO_2$ ceramic, calcined and milled $BZYNiO_2$ powders were pressed into pellets and then sintered at 1500° C. for 10 h in air. Some BZY20 powder was also prepared by the combined EDTA-citric acid (CEC) method and calcined at 1100° C. for 10 h (denoted as BZY20-CEC).

TABLE 1

List of abbreviations for Ni—BZY (volume ratio 40:60) membranes prepared with different types and amounts of BZY powders.

| Abbreviation | BZY powders |
| --- | --- |
| Ni—BZY1 | $BZYNiO_2$ |
| Ni—BZY2 | BZY20-SSR |
| Ni—BZY3 | 40% BZY20-SSR, 60% BZY20-CEC |
| Ni—BZY4 | 20% BZY20-SSR, 80% BZY20-CEC |

To study the effect of phase composition on the chemical stability of Ni—BZY membranes, different BZY powders with different weight contents were used to fabricate 4 different Ni—BZY membranes (as listed in Table 1). Calculated amounts of BZYNiO2, BZY20, and BZY20-CEC powders were mixed with Ni powders in volume ratio of 60:40 (ceramic vs Ni). These powders were ball-milled, dried, milled, and pressed into pellets with a 20-mm stainless steel die under the pressure of 100 MPa. These pellets were sintered at 1440° C. for 20 h in $N_2$ and another 20 h in 5% $H_2/N_2$. During the sintering process in $N_2$ (contains ~0.02 vol % $O_2$, measured by gas chromatography), partial Ni was oxidized to NiO which reacted with residual $BaCO_3$ and $Y_2O_3$, forming $BaY_2NiO_5$ and promoting the densification and grain growth of BZY phase. During the sintering process in 5% $H_2/N_2$, residual NiO was reduced to Ni and $BaY_2NiO_5$ decomposed forming Ni and a secondary phase. The reduction was confirmed by the increase of water content from ~0.3% to ~2.4% in the gas after switching $N_2$ to 5% $H_2/N_2$, monitored by a humidity sensor (Vaisala HMT338). The extended sintering time in 5% $H_2/N_2$ allowed the elimination of pores generated by the decomposition of $BaY_2NiO_5$.

The sintered BZYNiO2, Ni—BZY pellets were polished on a Buehler polisher with SiC sandpapers (320, 600, 1200 grits) and then diamond dispersion solution (9, 3, 1 µm) to reveal the surface microstructure. Polished BZYNiO2 pellet was annealed in wet $CO_2$ (3% $H_2O$) at 700° C. for 100 h to study its chemical stability in $CO_2$. A polished Ni—BZY1 sample was thermally etched at 1300° C. for 30 min in 5% $H_2/N_2$ for surface microstructure study. To test the chemical stability in water, the polished Ni—BZY pellets (~1 g in weight) were boiled in 30 mL deionized water for 20 h in Teflonlined stainless steel autoclaves. The polished Ni—BZY samples were also annealed in a gas mixture containing 3 vol % $H_2O$, 17 vol % $H_2$ and 80 vol % $CO_2$ at 900° C. for 50 h to test the chemical stability in wet $CO_2$.

$BaY_2NiO_5$ was synthesized by the solid state reaction (SSR) method. Stoichiometric amounts of $BaCO_3$, $Y_2O_3$, and NiO powders were ball-milled for 24 h in ethanol with $ZrO_2$ balls for 24 h. The powders were dried, pressed into pellets, and calcined at 1300° C. for 10 h. The pellets were milled into powders and then annealed in either dry/wet $H_2$ at 900° C. for 20 h, or wet $CO_2$ at 900° C. for 10 h. X-ray diffraction (XRD, Rigaku D/Max 2100, with Cu Kα radiation) analysis was used to identify the phases present in the powders and pellets. Rietveld refinements were carried out with GSAS package. Field emission scanning electronic microscopy (FESEM, Zeiss ultra plus) equipped with Energy-dispersive X-ray spectroscopy (EDX, Oxford) was used to study the microstructure and composition of the BZY and Ni—BZY membranes.

Results and Discussion:
Performance stability in wet $H_2$

Figure 2:
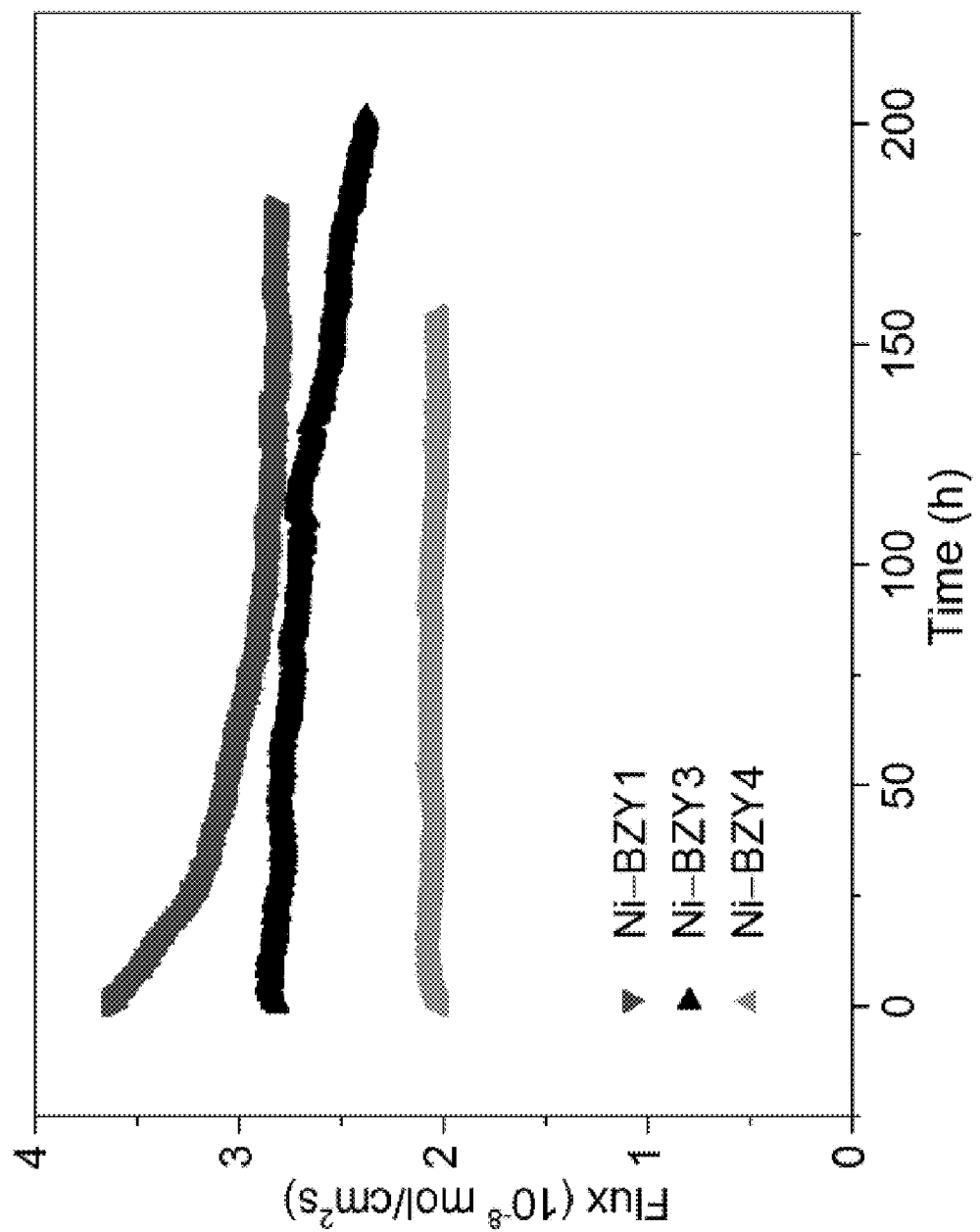
FIG. 2 shows the time dependence of hydrogen flux of Ni—BZY membranes prepared by different methods measured in wet 20% $H_2$ at 900° C. according to the Examples. All membrane thickness is 0.40 mm. The Ni—BZY4 membrane shows very stable performance during the whole measurement process (about 160 h).

FIG. 2 shows the time dependence of hydrogen flux of various Ni—BZY membranes at 900° C. in wet 20% $H_2$ (containing 3 vol % $H_2O$). The initial performance of the membranes follows such an order: Ni—BZY1>Ni—BZY3>Ni—BZY4 (3.6, 2.8, and 2.0*108 mol/cm$^2$s, respectively). In order to find the reason for the different initial flux, we investigated the microstructure of the membranes.

All membranes are composed of large Ni grains and small BZY grains. The grain sizes of BZY are estimated to be 1.44, 1.17, and 0.78 µm for Ni—BZY1, Ni—BZY3, and Ni—BZY4, respectively. Similar trend is observed for the permeation flux and grain size of BZY in Ni—BZY membranes. It is well-known that BZY possesses high bulk proton conductivity but suffers from poor grain boundary proton conductivity. Therefore, BZY ceramic with larger grain size and fewer grain boundaries also shows larger total proton conductivity than that with small grain size. Since the Ni—BZY membranes show the same behavior with BZY ceramics, the higher initial flux of Ni—BZY membranes with larger BZY grains is attributed to their fewer grain boundaries and higher total proton conductivities. The difference in grain sizes is due to the difference in the amount of $BaY_2NiO_5$ formed during the sintering process in $N_2$, and $BaY_2NiO_5$ promotes the grain growth of BZY phase.

The flux of Ni—BZY1 first degrades quickly and then slowly, with a total flux loss of 21.5% in 180 h. The flux of Ni—BZY3 degrades 15.0% in 200 h. However, the flux of Ni—BZY4 keeps stable during the whole test process (~160 h). It seems that there is a trade-off between the initial flux and performance stability of these membranes. Since both Ni and BZY are thermodynamically stable in $H_2$ and $H_2O$, it's hard to explain the degradation behavior. Therefore, the phase composition and microstructure was investigated of Ni—BZY1 membrane after the permeation test. Unlike the fresh membrane which only consists of Ni and BZY, the tested feed and sweep side surfaces contain much less BZY. Both $BaCO_3$ and YOOH are found on the feed and sweep side surfaces. The SEM images showed that the feed side surface is completely covered by new phases with plate-like structure, while the sweep side surface is only partially covered. EDX results showed that the plate-like phases contain Ba, C, Y, and O, indicating that they are $BaCO_3$ and YOOH, as revealed by the XRD results. Since the feed gas is wet $H_2$ without $CO_2$, $BaCO_3$ is formed by reaction between $Ba(OH)_2$ and $CO_2$ in air after the permeation test. These insulating phases ($Ba(OH)_2$ and YOOH) can block the pathways for hydrogen permeation, which explains the degradation behavior, but the sources of these insulating phases are still unclear. To obtain more insight in the sources of $Ba(OH)_2$ and YOOH, we investigated the chemical stability of Ni—BZY membranes by treating them in boiling water for 20 h or wet 17 vol % $H_2$ and 80 vol % $CO_2$ at 900° C. for 50 h.

Results and Discussion:
Chemical Stability in Boiling Water and Wet $CO_2$

The SEM images obtained from polished surface of fresh Ni—BZY1, 2, 3, and 4 membranes showed many small (~3 µm) bumps were found on the surface of Ni—BZY1. SEM-EDX analysis of polished Ni—BZY1 membrane shows that these bumps contain Ba, C, and Y, but no Ni, which can be $BaCO_3$ and $Y_2O_3$. EDX mapping results show that the porous clusters are rich in Y but are depleted of Ba, indicating that these clusters are $Y_2O_3$. This can be explained by the decomposition of $BaCO_3$ at 1300° C. forming volatile BaO, which evaporates to the atmosphere and leaves $Y_2O_3$ behind. These results suggest that the secondary phases formed in the fabrication process are ready to react with $H_2O/CO_2$ in air even at room temperature, forming $BaCO_3$ and $Y_2O_3$, which grow out of the polished surface. Unlike the small bumps found in Ni—BZY1, a few large (~20 µm) bumps with cracks were found on the surface of Ni—BZY2. There were much fewer bumps on the surface of Ni—BZY3, and it's difficult to find the bumps on the surface of Ni—BZY4. Therefore, the number of bumps and the amount of secondary phases follow such an order: Ni—BZY1>Ni—BZY2>Ni—BZY3>Ni—BZY4.

Figure 6:
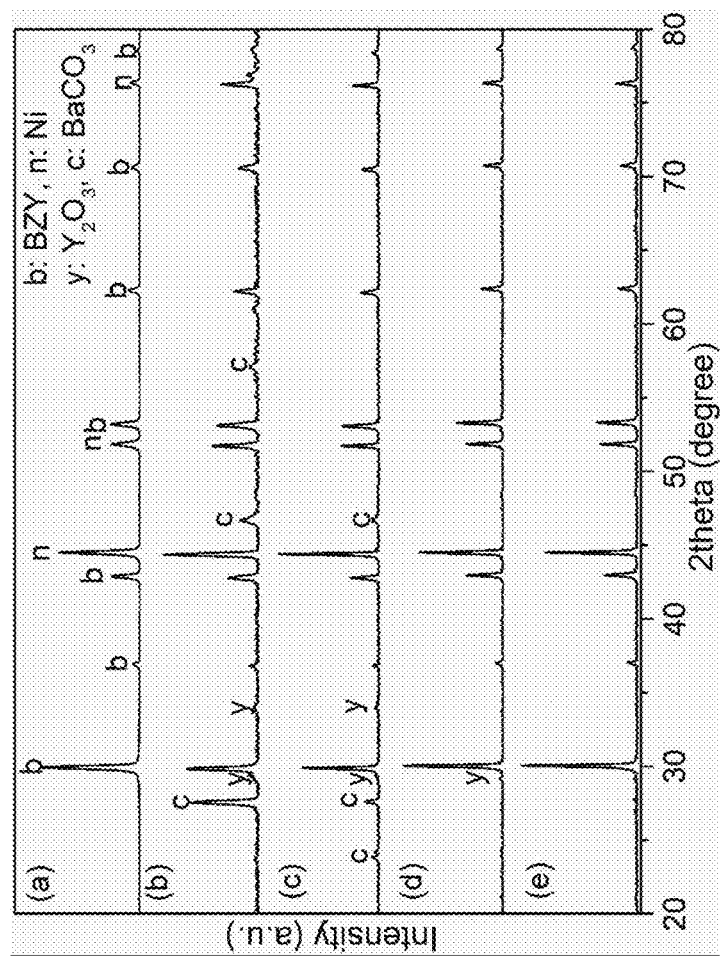
FIG. 6 shows XRD patterns obtained according to the Examples from surfaces of Ni—BZY1 after boiling for 20 h (a), Ni—BZY1 (b), Ni—BZY2 (c), Ni—BZY3 (d), and Ni—BZY4 (e) membranes after annealing in wet 17% H$_2$ and 80% CO$_2$ at 900° C. for 50 h, where b: BZY (JCPDS 06-0399), n: Ni (JCPDS 04-0850), c: BaCO$_3$ (JCPDS 05-0378), and y: Y$_2$O$_3$ (JCPDS 41-1105).

FIG. 6 shows the XRD pattern obtained from surface of Ni—BZY1 (a) after treatment in boiling water for 20 h (Similar results are also obtained for Ni—BZY2, 3, and 4). Only peaks of Ni and BZY are present in both patterns, confirming that the Ni and BZY phases are stable in boiling water. However, the pH value of the deionized water used in the boiling test for Ni—BZY1 and Ni—BZY2 increased from 7 to 12. Precipitate was observed after $H_2SO_4$ was added to the water, indicating formation of $BaSO_4$ (the sulphates of Ni, Y, Zr were all soluble in water). These results suggested that $Ba(OH)_2$ was formed during the boiling of the membranes. Because $Ba(OH)_2$ was soluble in water and the polished surface was very smooth, its amount on the membrane surface was too low to be detected by XRD. On the other hand, the pH value of water for boiling Ni—BZY3 and Ni—BZY4 kept at ~8, suggesting very small amount of $Ba(OH)_2$ was formed during the boiling process. After boiling test, significant microstructure damage was observed on the surfaces of Ni—BZY1 and Ni—BZY2 membranes. The characteristics of the surface microstructure damage agree very well with the sizes and distribution of secondary phases, such as small dotted bumps in boiled Ni—BZY1 and small dotted bumps in polished Ni—BZY1, large cracks in boiled Ni—BZY2 and large bumps in polished Ni—BZY2. A close look at the small bumps on boiled surface of Ni—BZY1 showed that they consist of BZY grains in the bottom and $Y_2O_3$ on the top. In contrast, Ni—BZY3 and Ni—BZY4 showed no cracks or bumps. These results suggest the secondary phases in Ni—BZY1 reacted with $H_2O$ forming a lot of $Ba(OH)_2$ and $Y_2O_3$, which can explain the formation of insulating phases on the membrane surfaces and thus the performance degradation in wet $H_2$.

XRD patterns in FIG. 6 show that a significant amount of $BaCO_3$ was detected on Ni—BZY1 and less was found on Ni—BZY2 after annealing in wet 80% $CO_2$. Surprisingly, no $BaCO_3$ was found on Ni—BZY3 and Ni—BZY4. This was further verified by SEM images. Most of the surfaces of Ni—BZY1 and Ni—BZY2 membranes were covered by the new phases. EDX spectrum showed that the new phases on Ni—BZY1 is composed of Ba, C, and O, which also suggests that the new phases is $BaCO_3$. However, there are only a little $BaCO_3$ on Ni—BZY3, which is below the detection limit of XRD. For Ni—BZY4, no $BaCO_3$ is observed. The amount of $BaCO_3$ follows such order: Ni—BZY1>Ni—BZY2>Ni—BZY3>Ni—BZY4. It is noticeable that Ni—BZY4 shows excellent chemical stability in both boiling water and wet $CO_2$.

Results and Discussion:
Performance Degradation and Chemical Instability

Results suggested that the performance degradation of Ni—BZY1 in wet $H_2$ was caused by the blocking phases ($Ba(OH)_2$ and YOOH) formed on the membrane surfaces. The chemical stability study showed that $Ba(OH)_2$ and $Y_2O_3$ was formed by the reaction between the secondary phases and water. Therefore, the flux degradation in wet $H_2$ was caused by $Ba(OH)_2$ and YOOH generated from the reaction between the secondary phase and $H_2O$. The more secondary phases there are in Ni—BZY membranes, the more $Ba(OH)_2+Y_2O_3$ is formed when exposed to water, and the more the performance degrades. The question is what the secondary phases are and where they come from. In the previous study, we observed $BaY_2NiO_5$ after Ni—BZY membranes were sintered in $N_2$ only. After the second sintering process in 5% $H_2/N_2$, $BaY_2NiO_5$ disappeared but no new phase was found by XRD. It is difficult to identify the new phases directly because they are mixed with large amount of Ni and BZY and are ready to react with $H_2O/CO_2$ in air. Therefore, we prepared $BaY_2NiO_5$ separately and investigated its chemical stability under various conditions.

Figure 7:
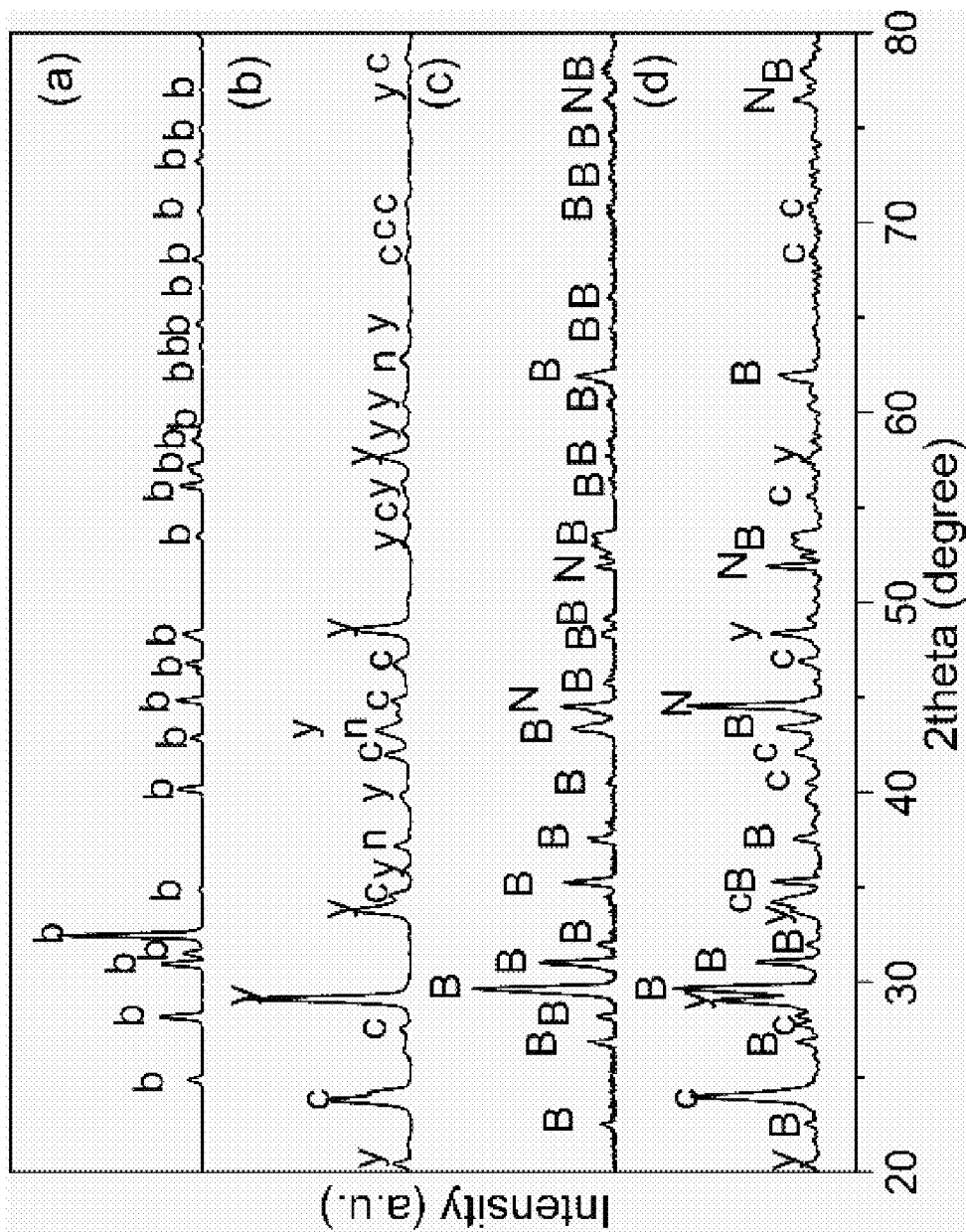
FIG. 7 shows XRD patterns of fresh BaY$_2$NiO$_5$ powder (a), BaY$_2$NiO$_5$ powder after annealing in CO$_2$ at 900° C. for 10 h (b), BaY$_2$NiO$_5$ powder after annealing in dry H$_2$ at 900° C. for 20 h (c), BaY$_2$NiO$_5$ powder after annealing in wet H$_2$ at 900° C. for 20 h (d), where b: BaY$_2$NiO$_5$ (JCPDS 41-0463), c: BaCO$_3$, y: Y$_2$O$_3$, n: NiO (JCPDS 78-0643), B: BaY$_2$O$_4$ (JCPDS 82-2319), N: Ni.

FIG. 7 shows the XRD patterns of $BaY_2NiO_5$ before and after annealing in different atmospheres at 900° C. After calcination at 1300° C. for 10 h, Immm structured $BaY_2NiO_5$ with lattice parameters of a=3.757 Å, b=5.754 Å, and c=11.315 Å is obtained. After annealing in $CO_2$ at 900° C. for 10 h (FIG. 7, b), $BaY_2NiO_5$ powder decomposes into a mixture of $BaCO_3$, $Y_2O_3$, and NiO ($BaY_2$—$NiO_5$+$CO_2$=$BaCO_3$+$Y_2O_3$+NiO). After annealing in dry $H_2$ (FIG. 7, c), $BaY_2NiO_5$ decomposes into $BaY_2O_4$ and Ni ($BaY_2NiO_5$+$H_2$=$BaY_2O_4$+Ni+$H_2O$). After annealing in wet $H_2$ (FIG. 7, d), aside from $BaY_2O_4$ and Ni, $Y_2O_3$ and $BaCO_3$ are found, suggesting that $BaY_2O_4$ partially reacts with $H_2O$ forming $Y_2O_3$ and $Ba(OH)_2$ which is converted to $BaCO_3$ when exposed to air. These results indicate that $BaY_2NiO_5$ is unstable in $H_2$, $H_2O$, and $CO_2$-containing atmospheres at 900° C., leading to the formation of insulating $BaY_2O_4$, $Ba(OH)_2$, and $BaCO_3$, respectively. Coors investigated reduced $BaCe_{0.2}Zr_{0.6}Y_{0.2}O_{3-\delta}$ (BCZY262, sintered with 1 wt. % NiO by solid state reactive sintering method) by field emission SEM and high resolution transmission electron microscopy (HRTEM). Only Ni metallic nanoprecipitates and some amorphous grain boundaries were observed. Therefore, $BaY_2NiO_5$ was assumed to decompose into Ni, BaO, and $Y_2O_3$ in reducing atmosphere. Then BaO and $Y_2O_3$ were dissolved back to perovskite lattice. In that case, BZYNiO2 should be chemically stable, which cannot explain the catastrophical failure of sintered BCZY262 ceramic during cooling below 400° C. in wet $H_2$. Instead, the failure can be attributed to the stress originated from volume increase accompanied with the reaction between $BaY_2O_4$ and $H_2O$ forming $Ba(OH)_2$ and $Y_2O_3$. $BaY_2O_4$ can be prepared by calcination of $BaCO_3$ and $Y_2O_3$ at 1000° C. for 10 h, suggesting that $BaY_2O_4$ is more stable than BaO (from the composition of $BaCO_3$) and $Y_2O_3$ at elevated temperature in $H_2O/CO_2$-free condition. Therefore, after sintering in $N_2$ and then 5% $H_2$, $BaY_2NiO_5$ in Ni—BZY decomposes into $BaY_2O_4$ and Ni, rather than BaO, $Y_2O_3$, and Ni. Unfortunately, both $BaY_2O_4$ and $BaY_2NiO_5$ easily react with $H_2O$ and $CO_2$, forming insulating phases.

These results can provide a clear explanation on the performance and chemical instability found in Ni—BZY1, 2, and 3 membranes. In Ni—BZY1, $BaY_2NiO_5$ is formed during the fabrication of BZYNiO2 powder. In Ni—BZY2, 3, and 4, residual $BaCO_3$ and $Y_2O_3$ in BZY20 prepared by the SSR method reacts with NiO (from the oxidation of partial metal Ni in $N_2$ containing 0.02% $O_2$) forming $BaY_2NiO_5$. $BaY_2NiO_5$ is reduced to $BaY_2O_4$ and Ni during sintering in 5% $H_2/N_2$. $BaY_2O_4$ is distributed as isolated islands and react with $H_2O$ during permeation test in $H_2$, forming insulating barium and yttrium hydroxides on the membrane surfaces and causing the performance degradation. $BaY_2O_4$ reacts with $H_2O$ and $CO_2$ forming $Ba(OH)_2$+$Y_2O_3$ and $BaCO_3$+$Y_2O_3$ during the chemical stability test in boiling water and wet $CO_2$, respectively. Less $BaY_2O_4$ will lead to less insulating phases on the membrane surfaces and less performance degradation when exposed to $H_2O$ and $CO_2$, as observed in the performance and chemical stability study. In Ni—BZY3 and Ni—BZY4, the BZY20-CEC grains also act as a covering layer for $BaY_2O_4$, and keeps $BaY_2O_4$ away from attack by $CO_2$ and $H_2O$, leading to higher chemical stability. Similar strategy has been employed in a $BaCe_{0.8}Sm_{0.2}O_{3-\delta}$—$Ce_{0.8}Sm_{0.2}O_{2-\delta}$ composite electrolyte and successfully avoided the chemical instability issue of $BaCeO_{3-\delta}$. Apparently, the amount of $BaY_2O_4$ is too large to be fully covered by BZY20-CEC in Ni—BZY3, but is small enough to be fully covered by BZY20-CEC in Ni—BZY4. We also tried to prepare Ni—BZY membrane only with BZY20-CEC powder, however, the obtained membrane possessed significant porosity due to lack of $BaY_2NiO_5$ as sintering aid. The Ni—BZY4 membrane demonstrated both excellent chemical stability and sinteractivity, and its performance stability was further tested in wet $CO_2$.

Results and Discussion:

Performance and Microstructural Stability of Ni—BZY4 Membrane in Wet $CO_2$

Figure 3:
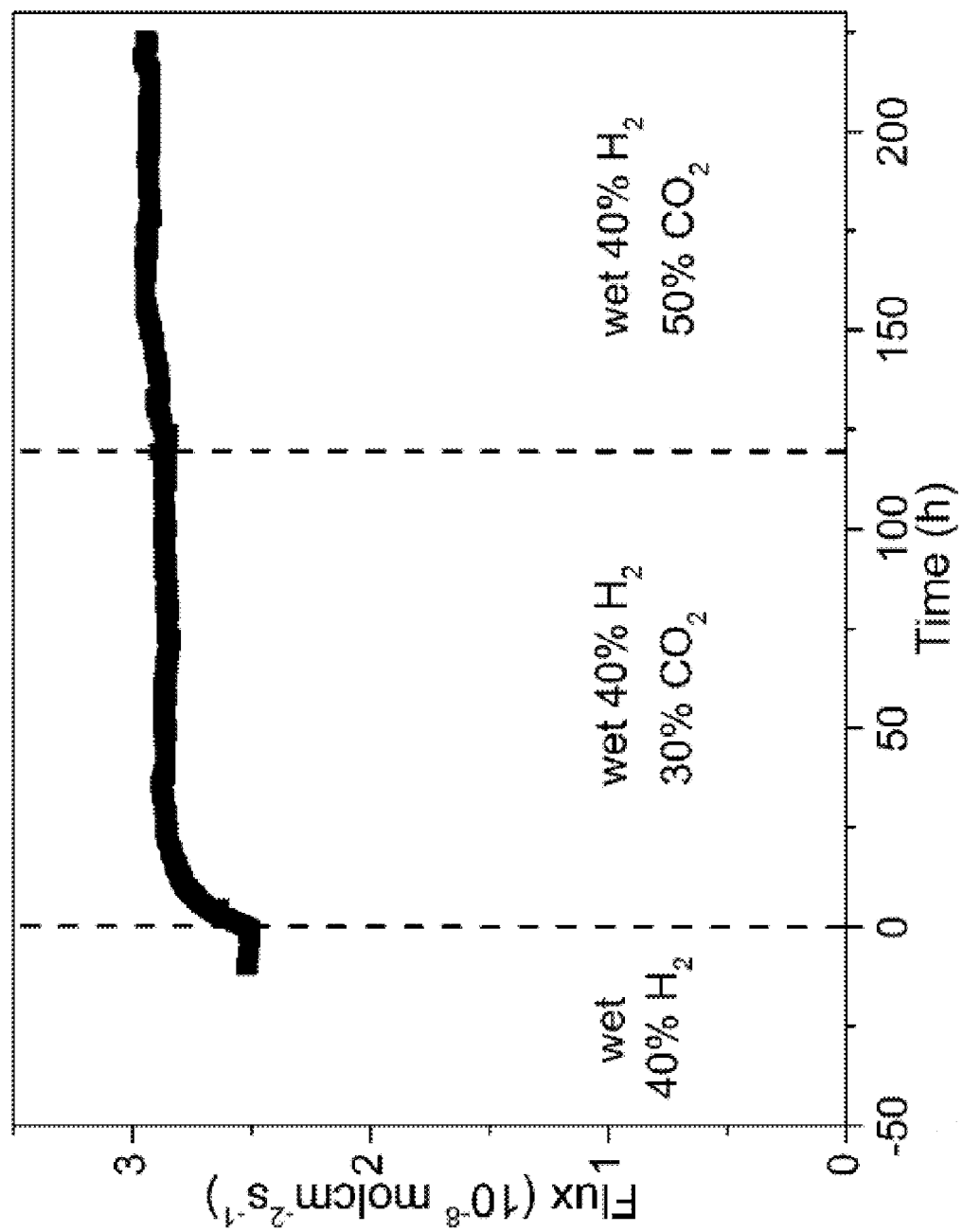
FIG. 3 shows time dependence of the hydrogen permeation flux of a 0.40-mm-thick Ni—BZY4 membrane in wet 40% $H_2$ with 0, 30, 50% $CO_2$ at 900° C., according to the Examples. The membrane shows very stable and even enhanced performance during the measurement in $CO_2$ (about 160 h).

Hydrogen separation membranes are expected to be applied in wet $H_2$ with considerable amount of $CO_2$. Therefore, its performance stability in $CO_2$ is critical to its application. FIG. 3 shows that the flux of Ni—BZY4 membrane in 40% $H_2$ increases from $2.5*10^8$ to $2.8*10^8$ and $2.9*10^8$ mol/cm$^2$s after introduction of 30% and 50% $CO_2$, respectively. Except for the initial flux increase, the flux keeps stable during the test in wet $CO_2$ for 225 h. The flux increase is ascribed to the reverse water gas shift (RWGS, $H_2+CO_2 \rightarrow H_2O+CO$) reaction which leads to the increase of moisture content in feed gas and thus proton conductivity in BZY phase, which is previously observed in Ni—BZCYYb membrane. The RWGS reaction consumes equal amount of $H_2$ and $CO_2$, generating same amount of $H_2O$ and CO. The measured CO content is 1.9% after the introduction of 30% $CO_2$, indicating that the moisture content increases from 3% (from the water bubbler) to 4.9%, and the hydrogen content decreases from 40% to 38.1%. The former is beneficial for the increase of the proton conductivity of BZY and hydrogen flux, while the latter is deleterious to hydrogen flux by reducing hydrogen partial pressure gradient across the membrane. Nevertheless, the flux increases, suggesting the former is dominant in the case of Ni—BZY4 membrane. In a very recent report, Zhu et al. developed a dense Ni—BaZr$_{0.7}$Pr$_{0.1}$Y$_{0.2}$O$_{3-\delta}$ (Ni—BZPY) membrane utilizing the benefit of Pr-doping on the sinter-activity of BZY. Because Pr$^{4+}$ can easily be reduced to Pr$^{3+}$ and even Pr$^{2+}$, the doping of Pr in BZY introduces additional oxygen vacancies, which can promote the RWGS reaction, as observed in Ce-doped BZY. The hydrogen content in feed gas decreased dramatically from 40% to 28% after introduction of 30% $CO_2$ at 850° C. Therefore, the flux decreased from $7.3*10^{-9}$ to $6.1*10^{-9}$ mol/cm$^2$s. Besides, the flux of a 0.40-mm-thick Ni—BZPY membrane in wet 40% $H_2$ at 900° C. was only $9.2*10^{-9}$ mol/cm$^2$s, much lower than that of Ni—BZY4 membrane ($2.5*10^{-8}$ mol/cm$^2$s in the same condition). Therefore, Ni—BZY4 is superior to Ni—BZPY membrane in both performance and performance stability.

After permeation test in wet $CO_2$, the microstructure of Ni—BZY4 membrane was investigated by SEM, which showed that the whole membrane is still compact and no obvious porosity is observed. There is no coarsening of Ni particles close to the feed side surface. Only peaks of Ni and BZY can be found in the XRD pattern obtained from the feed side surface. The feed side surface consists of large Ni particles and small BZY grains. In comparison, the feed side surface of Ni—BZY1 membrane are completely covered by plate-like phases including $BaCO_3$ and YOOH after test in wet $H_2$, which is much milder than wet 50% $CO_2$. Although the surface looks porous, the cross-sectional view shows the porous layer only reaches a depth of several microns. Similar microstructure is observed on the sweep side of the membrane.

Figure 4:
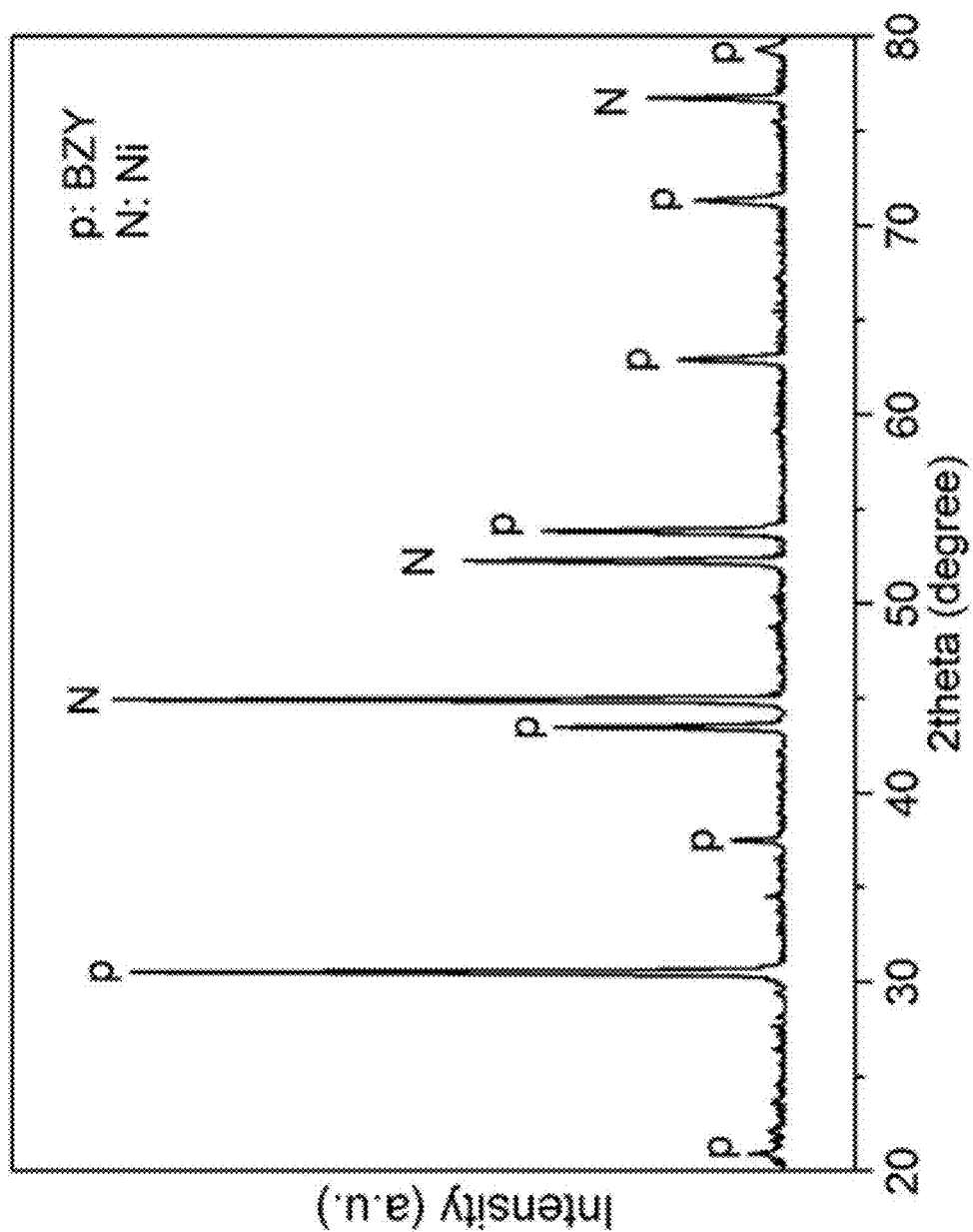
FIG. 4 shows the XRD pattern of Ni—BZY4 membrane surface after permeation test in wet $H_2$ and $CO_2$ at 900° C., according to the Examples. The XRD patterns only shows XRD peaks corresponding to BZY or Ni phases, suggesting that Ni and BZY phases remained stable in wet 50% $CO_2$ at 900° C.

After permeation test in wet $CO_2$, the microstructure of Ni—BZY4 membrane was investigated by SEM, which shows that the whole membrane is still compact and no obvious porosity is observed. There is no coarsening of Ni particles close to the feed side surface. Only peaks of Ni and BZY can be found in the XRD pattern obtained from the feed side surface (FIG. 4). The feed side surface consists of large Ni particles and small BZY grains. In comparison, the feed side surface of Ni—BZY1 membrane are completely covered by plate-like phases including $BaCO_3$ and YOOH after test in wet $H_2$, which is much milder than wet 50% $CO_2$. Although the surface looks porous, the cross-sectional view shows the porous layer only reaches a depth of several microns. Similar microstructure is observed on the sweep side of the membrane.

Results and Discussion:

Implication on the Feasibility of Using BZYNiO2 as Electrolyte for SOFCs

Figure 8A:
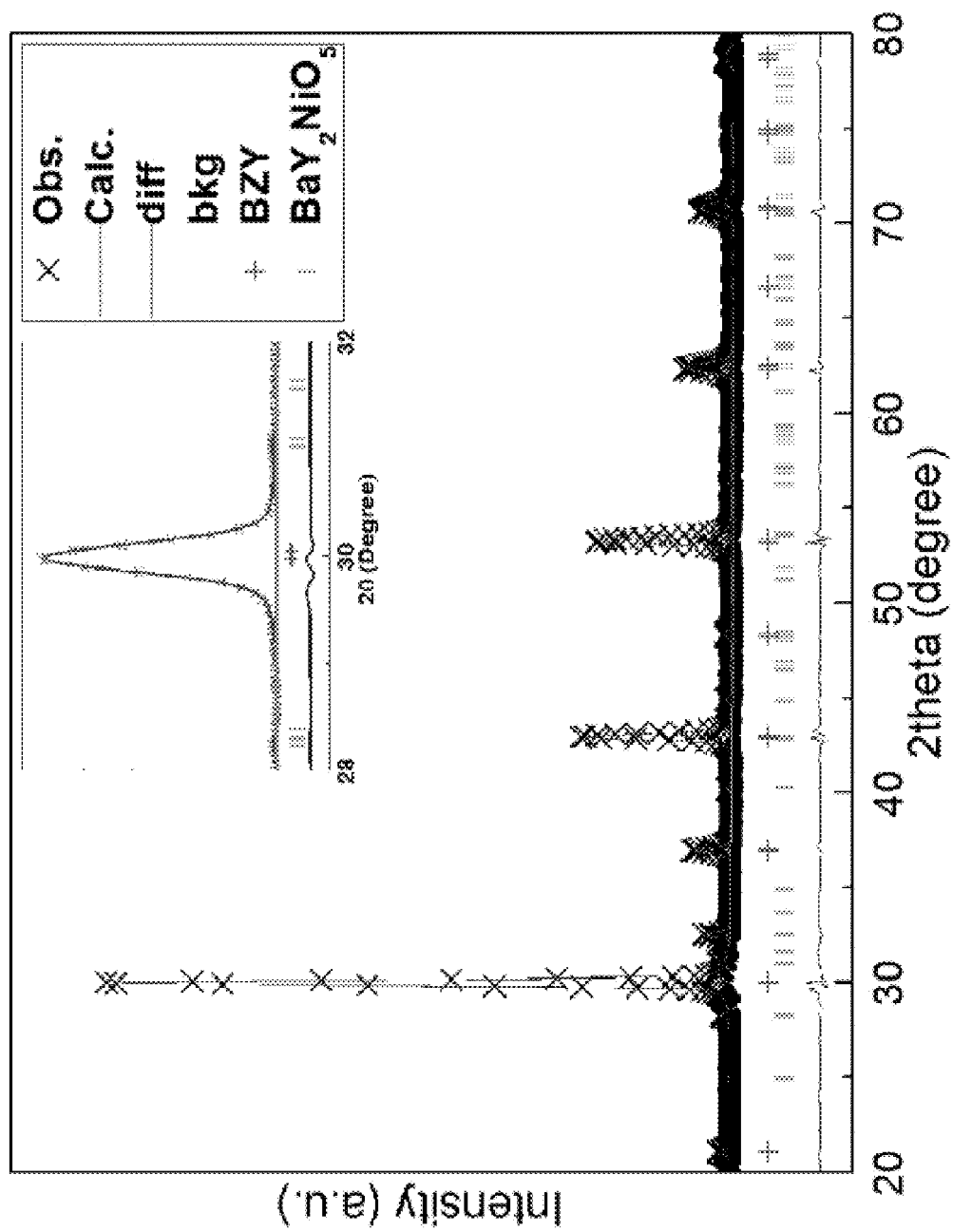
FIG. 8a shows Rietveld refinement for XRD patterns obtained from surfaces of sintered BZYNiO2 pellets before treatment in wet CO$_2$ at 700° C. for 100 h. The unit cells and lattice constants are summarized in Table 2.
Figure 8B:
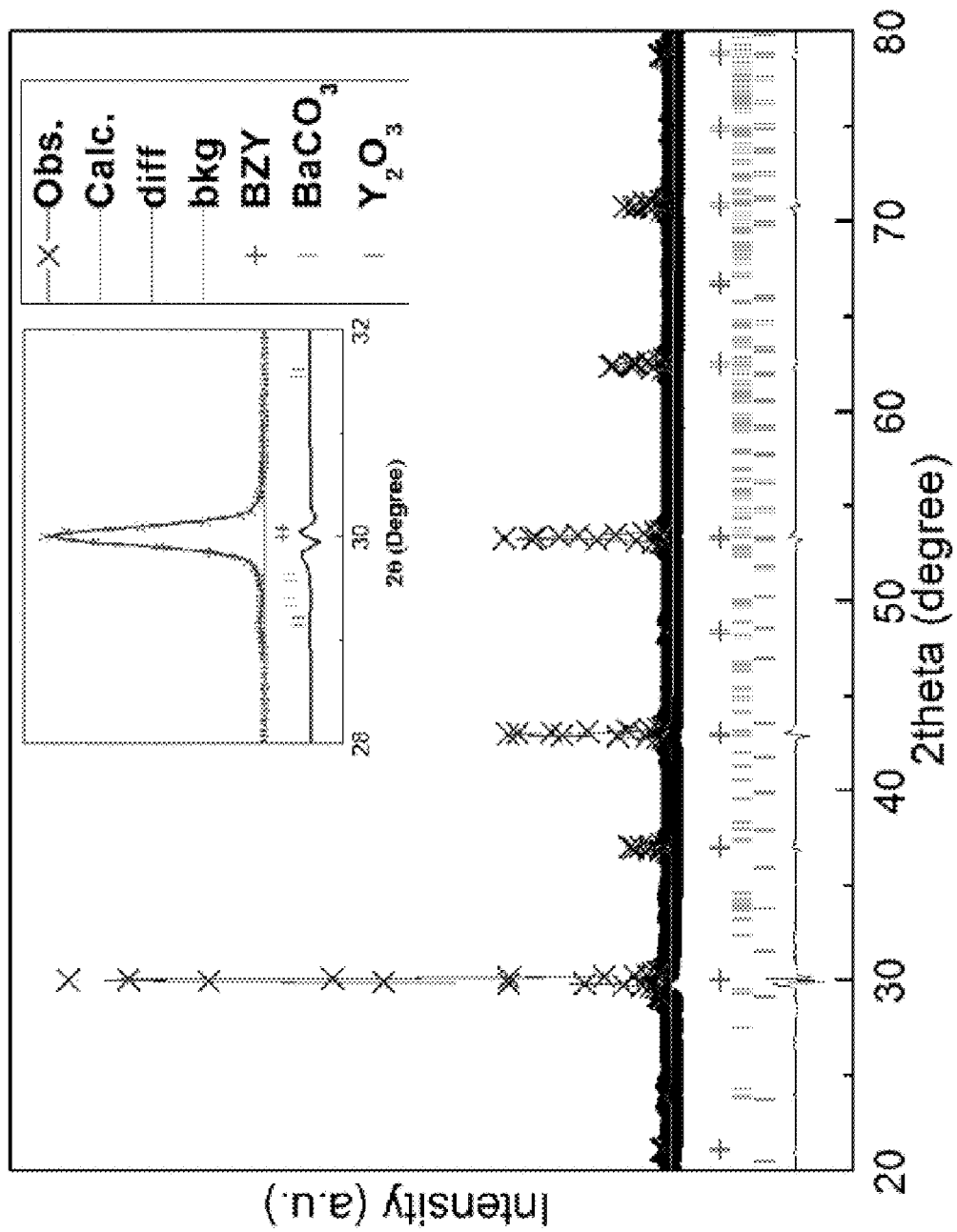
FIG. 8b shows Rietveld refinement for XRD patterns obtained from surfaces of sintered BZYNiO2 pellets after treatment in wet CO$_2$ at 700° C. for 100 h. The unit cells and lattice constants are summarized in Table 2.
Figure 9A:
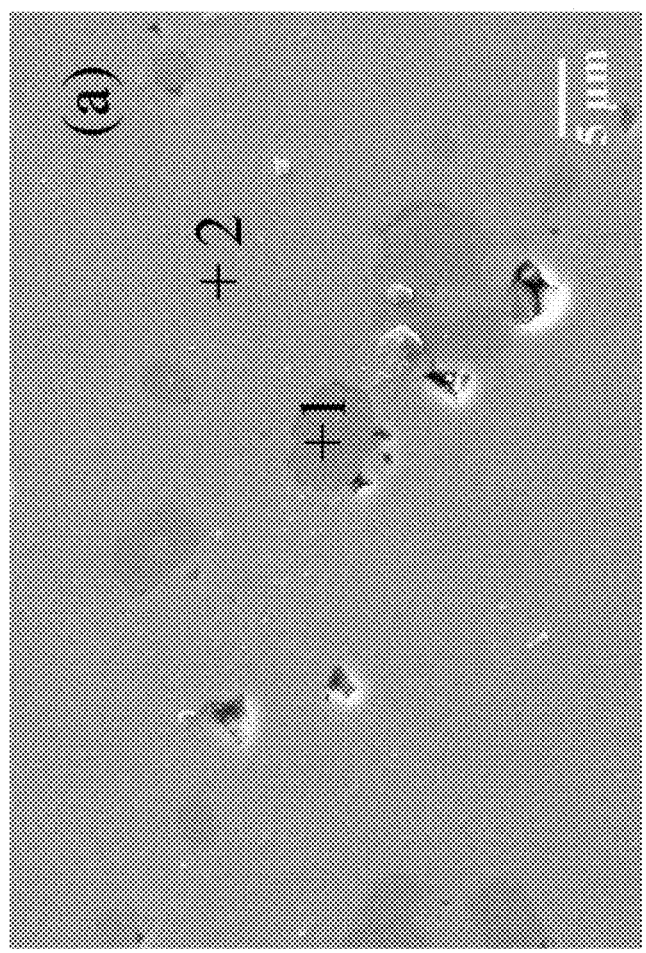
FIG. 9a shows surface SEM images of BZYNiO2 before treatment in wet CO$_2$ at 700° C. for 100 h.
Figure 9B:
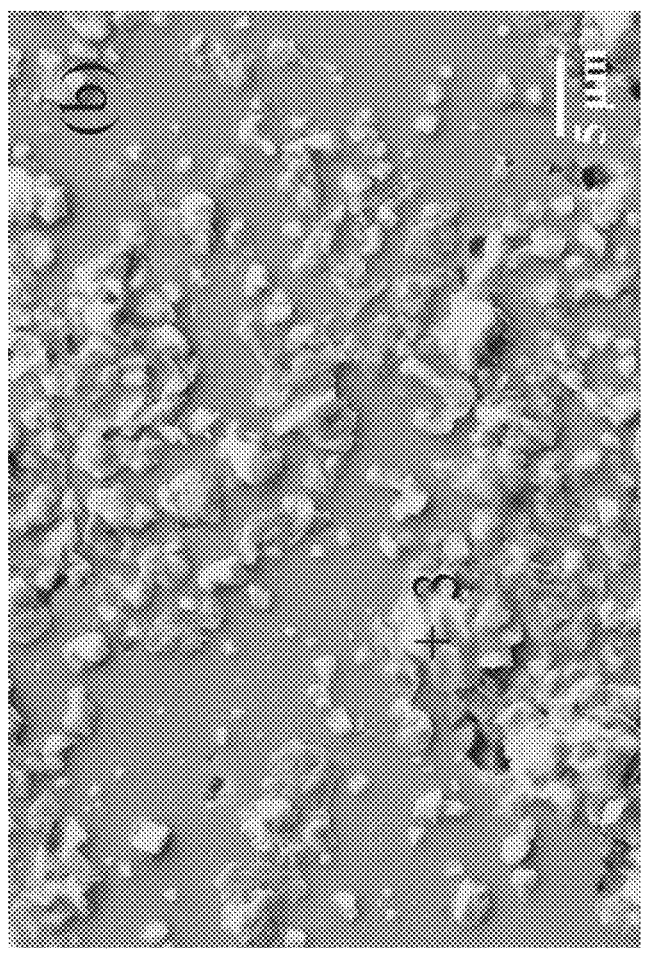
FIG. 9b shows surface SEM images of BZYNiO$_2$ after treatment in wet CO$_2$ at 700° C. for 100 h.
Figure 10:
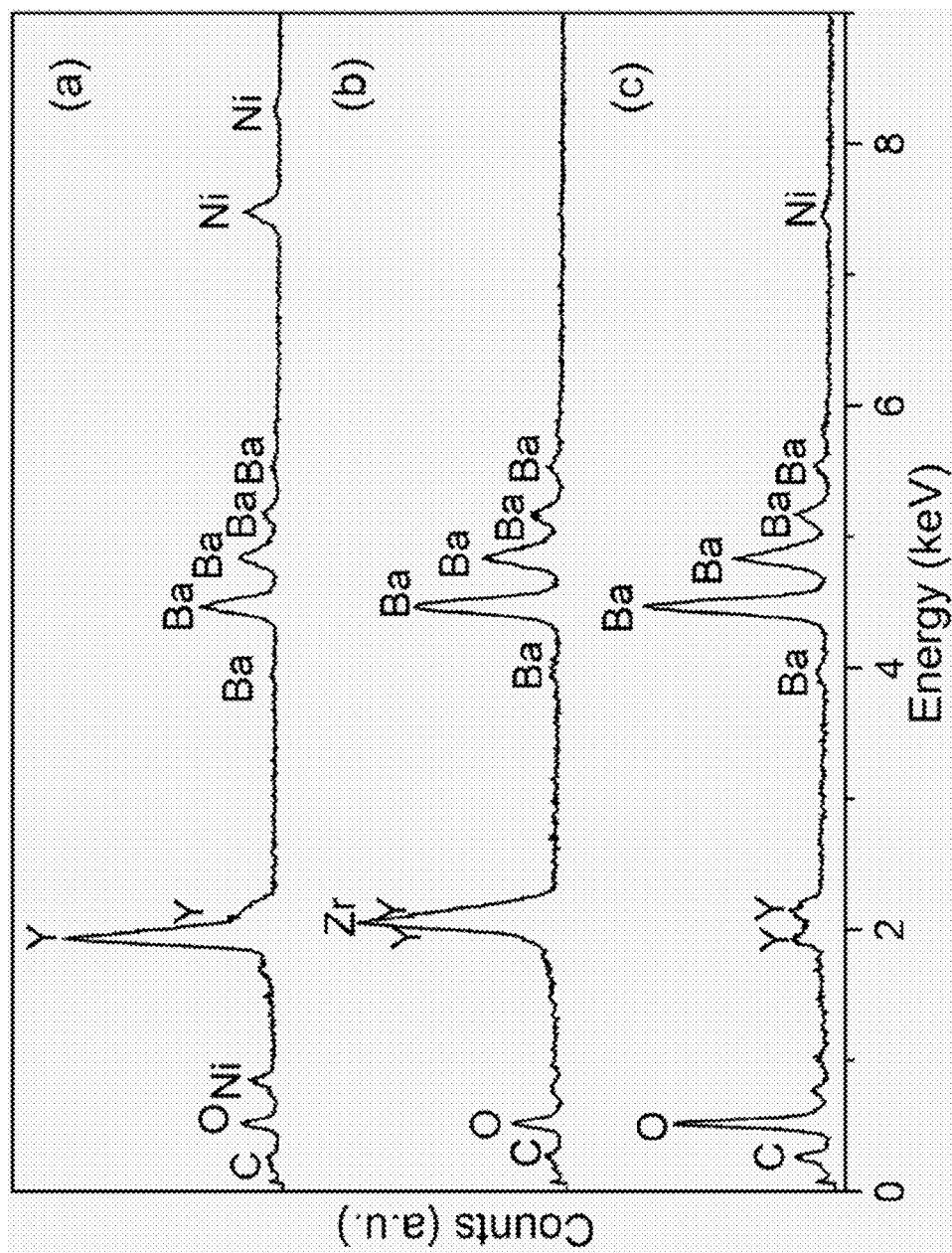
FIG. 10 shows EDX spectra obtained from spots 1 (a), 2 (b), and 3 (c) in FIG. 9.

An important implication of this study is that BaY$_2$NiO$_5$ can react with $CO_2$ forming $BaCO_3$ and $Y_2O_3$, this may be a serious problem for BZYNiO2, which is proposed as a promising electrolyte material with great sinter-activity and high electrical conductivity. Until now, no study has been reported on its chemical stability, which is crucial for its successful application. Rietveld refinements of the XRD profiles in FIG. 8a show that fresh BZYNiO2 consists of BZY and BaY$_2$NiO$_5$. After annealing in wet $CO_2$ at 700° C. for 100 h, BaY$_2$NiO$_5$ disappears but $BaCO_3$ and $Y_2O_3$ are found (FIG. 8b). SEM image in FIG. 9 showed that the polished surface of BZYNiO2 before exposure to $CO_2$ is very dense. It is noticeable that some dark spots are randomly distributed in the ceramic matrix. EDX spectra in FIGS. 10a and b, show that the dark phase consists of Ba, Y, Ni, and O, while the light phase consists of Ba, Zr, Y, and O. Considering the XRD results, the dark and light phases are BaY$_2$NiO$_5$ and BZY, respectively. After annealing in wet $CO_2$, the surface of BZYNiO2 is covered by many crystal-like particles with a size ranging from hundreds of nanometers to a few microns. The EDX spectrum in FIG. 10c shows that the particles mainly contain Ba, C, Y, and O, suggesting that they are $BaCO_3$ and $Y_2O_3$. It can be seen from the coverage that the amount of $BaCO_3$ and $Y_2O_3$ is much more than that of BaY$_2$NiO$_5$ on the fresh membrane surface, probably due to diffusion of Ba$^{2+}$ from BaY$_2$NiO$_5$ inside the BZYNiO2 ceramic. One may ask whether Ba-excessive BZY contribute to the formation of $BaCO_3$. This is unlikely because there should be a significant change in the lattice parameter if Ba-excessive BZY reacts with $CO_2$, however, there is almost no change in the lattice parameter of BZY phase (obtained from Rietveld refinement of XRD profiles of BZYNiO2 before and after the annealing in wet $CO_2$, 4.208 and 4.206 Å, respectively, FIGS. 8a and b). These results clearly suggest that BaY$_2$NiO$_5$ in BZYNiO2 makes it chemically instable in $H_2O/CO_2$, which needs to be resolved before it is used as electrolyte for solid oxide fuel cells. This problem may be solved by a similar strategy as that in Ni—BZY4. BZYNiO2 prepared by solid state reaction method can cause the formation of BaY$_2$NiO$_5$ which is an efficient sintering aid but also cause chemical instability, and BZY prepared by CEC method is chemically stable but not sinter-active. The combination of these powders can lead to a chemically stable yet still sinter-active proton conductor.

TABLE 2

Lattice constants of phases in fresh and annealed BZYNiO2 determined by Rietveld refinement of XRD patterns in FIG. 8.

| Sample | Phase | Unit cells | Lattice constants (Å) |
|---|---|---|---|
| Fresh BZYNiO2 | BZY | Cubic (Pm3̄m) | 4.208 |
|  | BaY$_2$NiO$_5$ | Orthorhombic (Immm) | a = 3.757, b = 5.755, c = 11.320 |

TABLE 2-continued

Lattice constants of phases in fresh and annealed BZYNiO2 determined by Rietveld refinement of XRD patterns in FIG. 8.

| Sample | Phase | Unit cells | Lattice constants (Å) |
|---|---|---|---|
| Annealed BZYNiO2 | BZY | Cubic (Pm$\bar{3}$m) | 4.206 |
| | BaCO$_3$ | Orthorhombic (Pmcn) | a = 5.306, b = 8.891, c = 6.471 |
| | Y$_2$O$_3$ | Cubic (Ia$\bar{3}$) | 10.595 |

CONCLUSIONS

Although BZY possesses excellent chemical stability in H$_2$O and CO$_2$, BZY ceramic and Ni—BZY membranes sintered using NiO sintering aid are chemically instable because of the formation of BaY$_2$NiO$_5$. BaY$_2$NiO$_5$ reacts with H$_2$, H$_2$O, and CO$_2$, forming insulating BaY$_2$O$_4$, Ba(OH)$_2$, and BaCO$_3$ phases, respectively. Previous report suggested that BaY$_2$NiO$_5$ was reduced to BaO and Y$_2$O$_3$, which were dissolved back to BZY lattice. However, we find that Ni—BZY membranes contain BaY$_2$O$_4$ islands after reduction. Both BaY$_2$NiO$_5$ and BaY$_2$O$_4$ easily react with H$_2$O and CO$_2$ forming Ba(OH)$_2$ and BaCO$_3$, respectively. Therefore, both BZYNiO2 and Ni—BZY are chemically instable in wet CO$_2$, and the hydrogen flux of Ni—BZY membranes degraded significantly in wet H$_2$ at 900° C. A comparative study shows that the more BaY$_2$O$_4$ there is in Ni—BZY membranes, the less stable they are. The chemical instability greatly restricts the applications of BZYNiO2 and Ni—BZYNiO2 as electrolytes for solid oxide fuel cells and hydrogen separation membranes, respectively. Fortunately, the chemical stability of Ni—BZY membranes can be improved by reducing the amount of BaY$_2$O$_4$ formed in the fabrication process. This is achieved by replacing a portion of BZY20 powder in the starting material with BZY20-CEC powder. The BZY20-CEC grains also act as a covering layer for BaY$_2$O$_4$ and helps avoid the reaction between BaY$_2$O$_4$ and H$_2$O/CO$_2$. The new Ni—BZY4 membrane fabricated with 20% BZY20-SSR and 80% BZY20-CEC powders demonstrated very stable and improved permeation flux in wet 50% CO$_2$ at 900° C. The phase composition and membrane microstructure were also intact after the test, indicating its excellent chemical stability, surpassing previous Ni—BZCYYb membrane. It also possesses much higher hydrogen flux than Ni—BZPY. These facts demonstrate that Ni—BZY4 is very promising for hydrogen permeation applications.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A hydrogen permeation membrane, comprising: a metal and a ceramic material mixed together, wherein the metal comprises Ni, and wherein the ceramic material has the formula:

$$BaZr_{1-x-y}Y_xT_yO_{3-\delta}$$

where
0<x≤0.5,
0≤y≤0.5,
0<(x+y)<1;
0≤δ≤0.5, and
T is Sc, Ti, Nb, Ta, Mo, Mn, Fe, Co, Ni, Cu, Zn, Ga, In, Sn, or combinations thereof, wherein at least a portion of the ceramic material is prepared with EDTA, citric acid, or a combination thereof prior to mixing with the metal.

2. The hydrogen permeation membrane of claim 1, comprising the ceramic material in about 40% to about 80% by volume.

3. The hydrogen permeation membrane of claim 1, wherein the hydrogen permeation membrane has a thickness of about 0.01 mm to about 10 mm.

4. The hydrogen permeation membrane of claim 1, where 0<y≤0.5.

5. The hydrogen permeation membrane of claim 4, where 0<δ≤0.5.

6. A method of forming a membrane, comprising:
mixing a metal and a ceramic powder to form a metal-ceramic mixture, wherein the metal comprises Ni;
pressing the metal-ceramic mixture to form a composite membrane; and
sintering the metal-ceramic mixture at a temperature of about 1100° C. to about 1700° C.,
wherein the ceramic powder comprises a ceramic material having the formula:

$$BaZr_{1-x-y}Y_xT_yO_{3-\delta}$$

where 0<x≤0.5, 0≤y≤0.5, 0<(x+y)<1; 0≤δ≤0.5, and T is Sc, Ti, Nb, Ta, Mo, Mn, Fe, Co, Ni, Cu, Zn, Ga, In, Sn, or combinations thereof, wherein at least a portion of the ceramic powder is prepared with EDTA, citric acid, or a combination thereof.

7. The method of claim 6, wherein the metal-ceramic mixture is sintered in a reducing atmosphere.

8. The method of claim 7, wherein the reducing atmosphere comprises H$_2$.

9. The method of claim 6, further comprising:
heating the metal-ceramic mixture is in an inert atmosphere prior to sintering in the reducing atmosphere.

10. The method of claim 9, wherein the inert atmosphere comprises N$_2$.

11. The method of claim 9, wherein the inert atmosphere comprises Ar.

12. The method of claim 6, where 0<y≤0.5.

13. The method of claim 12, where 0<δ≤0.5.

14. The method of claim 6, wherein the metal and the ceramic powder are mixed such that the metal-ceramic mixture comprises the ceramic material in about 40% to about 80% by volume.

15. A method of extracting hydrogen from a feed stream, comprising:
exposing the feed stream to a first side of a membrane at a temperature of about 600° C. to about 1000° C., wherein the feed stream comprises hydrogen; and
collecting pure hydrogen gas from a second side of the membrane opposite of the first side,
wherein the membrane comprises a metal and a ceramic material, wherein the metal comprises Ni, and wherein the ceramic material has the formula:

$$BaZr_{1-x-y}Y_xT_yO_{3-\delta}$$

where 0<x≤0.5, 0≤y≤0.5, 0<(x+y)<1; 0≤δ≤0.5, and T is Sc, Ti, Nb, Ta, Mo, Mn, Fe, Co, Ni, Cu, Zn, Ga, In, Sn, or combinations thereof, wherein at least a portion of the ceramic material is prepared with EDTA, citric acid, or a combination thereof prior to mixing with the metal.

16. The hydrogen permeation membrane of claim 1, wherein the grain size of the ceramic material is less than or equal to 1.17 μm.

17. The hydrogen permeation membrane of claim 1, wherein a portion of the ceramic material is not sinter-active.

18. The hydrogen permeation membrane of claim 1, wherein the ceramic material comprises $BaZr_{0.8}Y_{0.2}O_{3-\delta}$.

* * * * *